United States Patent [19]
Mota et al.

[11] Patent Number: 5,257,911
[45] Date of Patent: Nov. 2, 1993

[54] WINDSCREEN WASHER PUMP PROVIDED WITH LEVEL SENSING DEVICE

[75] Inventors: Miguel Mota, Rubi; José L. Morales, Barcelona, both of Spain

[73] Assignee: Transpar Iberica S.A., Rubi, Spain

[21] Appl. No.: 910,113

[22] PCT Filed: Nov. 13, 1991

[86] PCT No.: PCT/ES91/00076

§ 371 Date: Jul. 6, 1992

§ 102(e) Date: Jul. 6, 1992

[87] PCT Pub. No.: WO92/08627

PCT Pub. Date: May 29, 1992

[30] Foreign Application Priority Data

Nov. 15, 1990 [ES] Spain ................... P9002898

[51] Int. Cl.$^5$ .......................... G01F 23/62; B60S 1/50
[52] U.S. Cl. ................... 417/63; 417/423.3; 417/435
[58] Field of Search .............. 417/40, 41, 63, 423.3, 417/435

[56] References Cited

U.S. PATENT DOCUMENTS

| | | |
|---|---|---|
| 3,593,267 | 7/1971 | Klein . |
| 3,941,073 | 3/1976 | Ridgeway .............. 417/40 X |
| 4,456,432 | 6/1984 | Mannino .............. 417/63 X |
| 4,934,914 | 6/1990 | Kabayashi et al. ........ 417/435 X |

FOREIGN PATENT DOCUMENTS

| | | |
|---|---|---|
| 0284662 | 10/1988 | European Pat. Off. . |
| 2540698 | 3/1977 | Fed. Rep. of Germany . |
| 2462594 | 2/1981 | France . |
| 9000819 | 3/1990 | Spain . |
| 1273543 | 5/1972 | United Kingdom . |

OTHER PUBLICATIONS

Patent Abstracts of Japan, vol. 10, No. 167 (M-488)(2223).
Patent Abstracts of Japan, vol. 12, No. 192 (P-172).

*Primary Examiner*—Richard E. Gluck
*Attorney, Agent, or Firm*—Michael J. Striker

[57] ABSTRACT

A windscreen washer pump has a casing which may be connected to a cleaning liquid reservoir and formed by a body member and by a cover which may be connected together. The body member is formed with a tubular suction extension, a pumping chamber and a discharge nozzle and a bent tubular extension attached to the cover by means of a passage member. The casing accommodates an impeller, a sealing joint and an electric motor for driving the impeller. The bent tubular extension contains a float which may make an electrical circuit across the free ends of the conductors housed in the passage member and connected to the terminals of the cover, and a stop valve preventing the liquid from flowing to the float chamber when the impeller is operating.

4 Claims, 2 Drawing Sheets

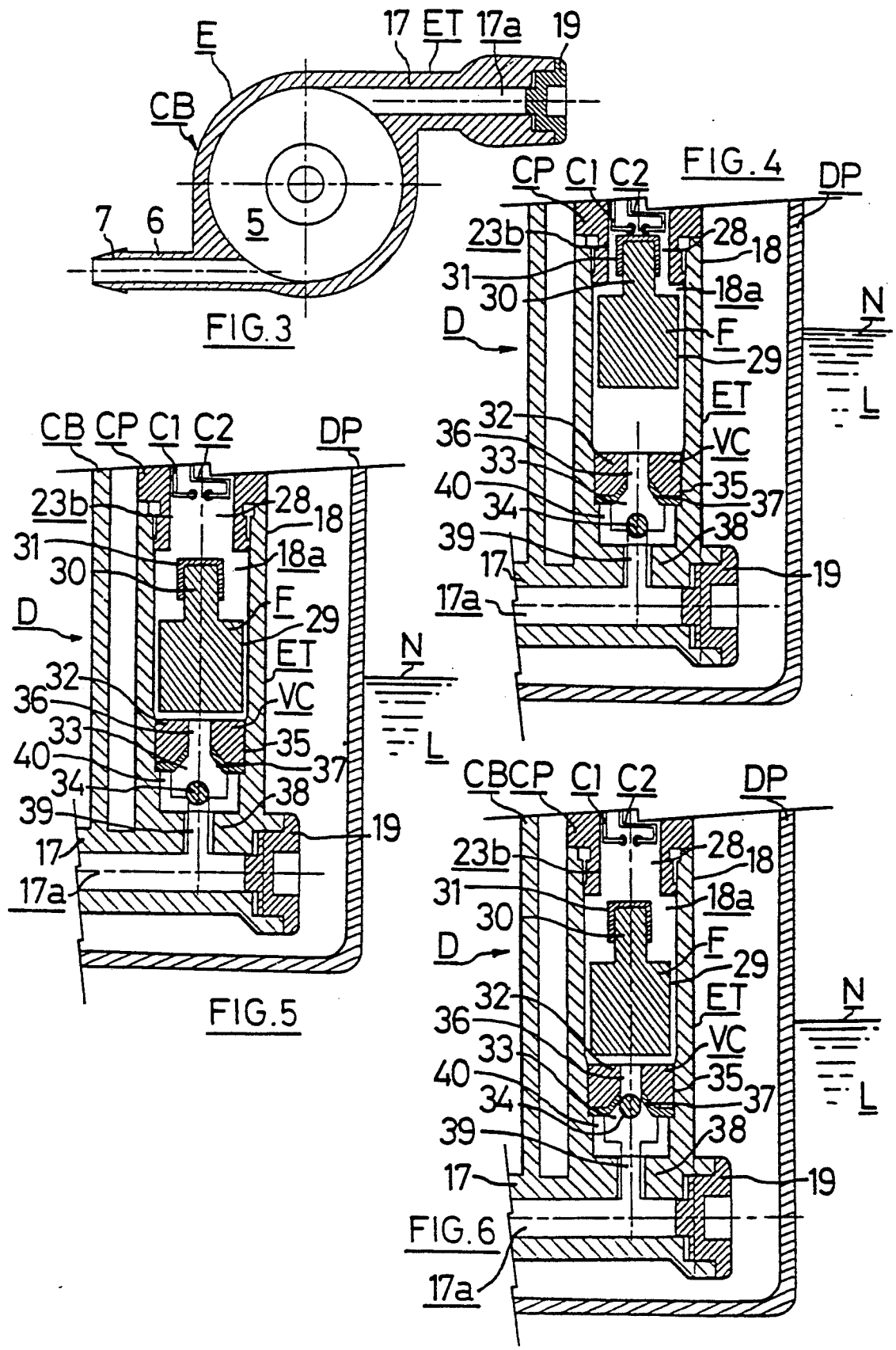

WINDSCREEN WASHER PUMP PROVIDED WITH LEVEL SENSING DEVICE

FIELD OF THE INVENTION

The object of the present invention is a windscreen washer pump provided with a level sensing device applicable to the equipment for cleaning the windscreens, rear screens and headlamps of motor vehicles.

BACKGROUND OF THE INVENTION

The equipment for the cleaning of the above mentioned glass surfaces, usually included as original equipment in motor vehicles, comprises, among other items as is well known, a pump which is adapted to a reservoir containing cleaning liquid and which pumps this liquid through tubing and sprays it over the said surfaces at a rate and with a pressure adapted to the needs of each particular application.

These pumps are driven by a d.c. electric motor which is connected through the corresponding protection and control members to the vehicle battery. Under these conditions, the pump is set running by way of the said control members disposed inside the vehicle and operated by the driver depending on the driving conditions of the vehicle.

From the foregoing, it has appeared necessary, for safety reasons, to keep a check over the amount of cleaning liquid available in the said auxiliary reservoir. This control consists normally of an optical and/or acoustical alarm signal, which is disposed in an appropriate place in the vehicle interior and which is operated by a device associated with the cleaning liquid reservoir.

In this way, the said signal indicates, on being activated, that the level of cleaning liquid in the reservoir has dropped to the preset minimum level.

The known embodiments of devices for controlling the level of cleaning liquid in the reservoir:

include devices which may be coupled, independently of the pump, to the cleaning liquid reservoir and which are operatively based on the action of a float on a reed relay; and also devices which may be integrated in the structure of the pump itself.

Among the latter, there may be mentioned the device disclosed in Spanish patent P.9000819 for "A control device for liquid levels", which operates by means of a continuity sensor which detects the presence of cleaning liquid in terms of the passage of a weak electric current through said liquid and which is connected to a reversing circuit and to an amplifying circuit which operates on the above mentioned signalling members.

Generally speaking, the known embodiments of such control devices integrated in the pump structure suffer from drawbacks relating to the high production costs and poor stability of the signal when the cleaning liquid level is substantially below the level chosen as limit for activation thereof.

SUMMARY OF THE INVENTION

Accordingly, it is an object of the present invention to provide a windscreen washer pump with a level sensing device, which avoids the disadvantages of the prior art.

More particularly, it is an object of the present invention to provide as windscreen washer pump with a level sensing device having integrated in the structure thereof a cleaning liquid level control which, when compared with the known embodiments, on the one hand reduces production costs and, on the other hand, notably increases the stability of the signal indicating that the cleaning liquid contained in the reservoir is at a level substantially below the preset minimum level.

In keeping with these objects and with others which will become apparent hereinafter one feature of the present invention resides in a pump for windscreen washers having a level sensing device of new construction.

The windscreen washer pump provided with the level sensing device of the invention is formed, essentially, by an approximately cylindrical casing which comprises a pump body member and a rear cover, which may be fixedly connected together by the corresponding mechanical means. Said pump body member is provided, at one end thereof, with an axial tubular cleaning liquid suction extension, a pumping chamber housing the suction-discharge impeller, a discharge nozzle disposed tangentially in the pumping chamber through which the cleaning liquid sucked by the impeller is discharged and by a sealed container housing the suction-discharge impeller electric drive motor. The rear cover of the casing is provided with means allowing the positioning of the electric motor. The connection of the motor to the supply lines and said pump is characterized in that the casing comprises also a level sensing device. The level sensing device has beside the pump body member and extending to the end provided with the pumping chamber, a bent tubular extension, one of the component portions, the horizontal portion, of which is in communication with said pumping chamber, while the other, the vertical portion, extends parallel to the centre axis of the casing up to a relatively short distance from the rear cover, the rear cover and the upper end of the bent tubular extension are connected together by a passage member provided with a free tubular intake projecting normal to the longitudinal axis of the casing for establishing permanent free communication with the inside of the cleaning liquid reservoir, so that, when there is a sufficient amount of cleaning liquid, this may flow between the said tubular intake and the pumping chamber of the pump body member of the casing. In the interior of the passage member, the free uninsulated ends of respective are, suitably spaced apart at a relatively short distance and connected at the other ends thereof to respective connection terminals disposed in the rear cover of the casing. Finally and in the interior of the vertical portion of the bent tubular extension, there is a float and a stop valve which is close to the bend of the said extension. The float may slide freely along the chamber situated in said portion of the extension, between the stop valve and the passage member.

The stop valve which, as said above, is disposed in the portion of the bent tubular extension attached to the passage member has:

an essentially cylindrical main body member fixedly attached to the said portion, said main body member being provided with a central axial through hole which, in the side facing the bend of the tubular extension, is formed with a closing seat. It also has adjacent the main body member on the side provided with the closing seat, a closing chamber defined longitudinally by the main body member itself and by a perimetral shoulder formed in the said portion and defining a through hole. Finally, it has an essentially spherical closing body member which is dimensioned in functional correspondence with the closing seat of the main body member and which is permanently housed in the closing chamber, the closing body member stoppers the through hole of the main body member and consequently prevents passage of the cleaning liquid upwardly through the stop valve when the liquid is urged by the pumping effect of the impeller in operation from the pumping chamber into the bent tubular extension. The stop valve allows, nevertheless, when there is no mechanical pumping effect, the cleaning liquid to flow freely in both directions maintaining constant fluid communication with the reservoir.

The float which, as stated above, is arranged in the vertical portion of the bent extension and in the chamber defined by the stop valve and said passage body member, is essentially cylindrical with a smaller diameter than the diameter of the said portion in which it is housed. Thereby it may freely slide longitudinally and it is provided at the end opposite the passage body member, with a smaller diameter extension which may enter in the passage body member. The extension is provided in the interior thereof with a metal contact which may make an electrical circuit across the free ends of the conductors disposed in the passage body member.

When the windscreen washer pump of the invention is suitably attached to the cleaning liquid reservoir, the level sensing device incorporated in the pump is based on the joint action of the stop valve and the float disposed in the vertical portion of the bent extension.

As stated above, the cleaning liquid contained in the reservoir is in permanent fluid communication with the interior of the vertical portion of the bent extension, through the axial tubular suction extension, the pumping chamber and the stop valve which is normally open, except when the pump is running. Therefore, if the cleaning liquid level in the reservoir is above the preset minimum level for the alarm signal to operate, the cylindrical extension of the float is housed in the passage body member and the metal contact of said extension makes an electrical circuit across the free ends of the conductors arranged in the passage body member. Under these conditions, the acoustical and/or light signal disposed on the vehicle dashboard is not activated.

When the level of cleaning liquid in the reservoir falls below the preset minimum level, the metal contact of the cylindrical extension of the float drops and therefore does not make an electrical circuit across the free ends of the conductors located in the passage body member. Under these conditions, the said acoustical and/or light signal is activated showing that the level of cleaning liquid available in the reservoir is below the preset minimum.

Once the metal contact of the cylindrical extension of the float has broken the electrical circuit across the free ends of the conductors of the passage body member as a result of the cleaning liquid falling below the preset alarm level, the action of the stop valve of the level sensing device prevents the internal level of the vertical portion of the bent extension from rising artificially when the pump is set running. Thereby the float should consequently rise and reestablish the contact across the free ends of the passage body member conductors and cancel the alarm signal, thereby causing confusion and perplexity in the observer.

In this way, once the level sensing device has detected a cleaning liquid level in the reservoir below the preset minimum level and the corresponding signal has been activated, it does not change this state until the level of cleaning liquid is above the preset minimum, on the reservoir being refilled. Therefore false signals relative to the cleaning liquid level available when the pump is set running are avoided.

On the other hand, since the windscreen washer pump of the invention integrates the level sensing device in its structure, it substantially reduces the production and assembly costs over the known embodiments.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a view on the line III—III of FIG. 1.

FIGS. 4, 5 and 6 are cross section views showing the operation of the level sensing device of the pump of the invention.

DESCRIPTION OF THE PREFERRED EMBODIMENTS

Figure 1:
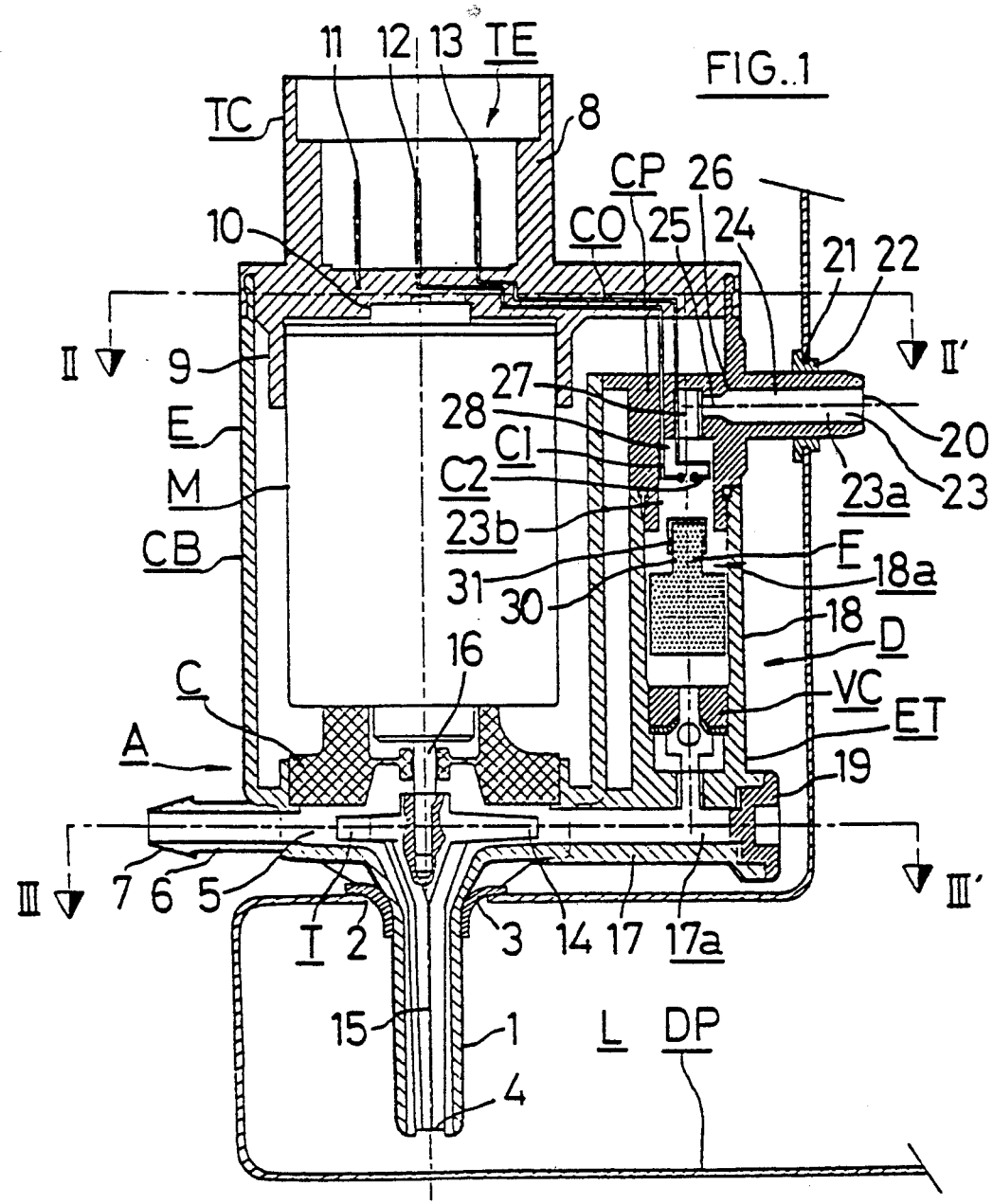
FIG. 1 is a cross section view of the pump of the invention.

The windscreen washer pump with level sensing device of the invention described as an exemplary embodiment includes, as shown in FIG. 1 of the drawing sheets, the casing E containing the suction-discharge impeller T, the sealing bushing C and the d.c. electric motor M driving the suction-discharge impeller T, and the level sensing device D.

FIG. 1 shows how the windscreen washer pump with level sensing device of the invention is coupled to the cleaning liquid L reservoir DP.

Figure 2:
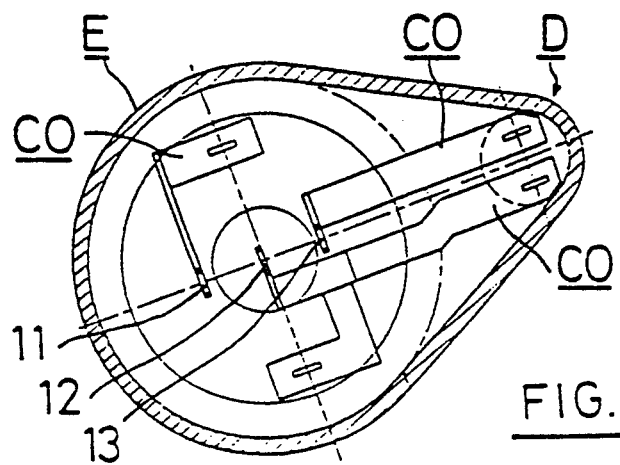
FIG. 2 is a view on the line II—II of FIG. 1.

The casing E, as shown in detail in FIGS. 1, 2 and 3, is essentially cylindrical and is formed by the pump body member CB and by the rear cover TC which may be assembled together.

The pump body member CB is provided, at the end A thereof, with;

an axial tubular extension 1 aspirating the cleaning liquid L, and inserted in the reservoir DP by way of a through hole 2 provided with. The sealing joint 3, the free end of the tubular extension has two transverse suction notches 4.

A pumping chamber 5 houses the suction-discharge impeller T. The discharge nozzle 6 is tangentially disposed relative to the pumping chamber 5, as shown in FIG. 3. Through the discharge nozzle 6 the cleaning liquid L is pumped out by the suction-discharge turbine T. The free end of the discharge nozzle 6 is provided with the frustoconical finish 7 for connection to the piping distributing the cleaning liquid L to the points of use. The piping and points of use are not shown in the Figures of the drawing sheets for clarity.

FIG. 1 shows how the rear cover TC is formed on the outer surface thereof with the hollow extension 8 for receiving the connector. The connector through appropriate protection and control circuits, allows electricity to be supplied from the vehicle battery to the drive motor M for the suction-discharge impeller T and connection of the level sensing device D to the circuit driving the alarm signal. The connector and circuits are not shown in the Figures of the drawing sheets for similar reasons to those given above.

The rear cover TC is formed on the inner surface thereof with the tubular extension 9 and orifice 10 which, as shown in FIG. 1, is for fixing the working position of the electric motor M.

The rear cover TC is provided with the connection terminals TE, which are located in the hollow extension 8 of the outer surface of the cover TC, to which the aforesaid connector is attached. In this embodiment, the connection terminals TE are three in number and are designated as 11, 12 and 13 as shown in FIGS. 1 and 2. The number and layout of the connection terminals TE may be varied depending on the needs which may arise in each particular application for the circuits with which these terminals TE are associated.

The connection terminals TE are connected to the electric motor M and to the level sensing device D by the conductors CO. They connect the terminals 11 and 13 respectively for the supply to the motor M and provide the electrical connection of the level sensing device D with the circuit driving the alarm signal. The connection terminal 12 is common to both circuits and is connected to the motor vehicle structure to which the negative terminal of the battery is connected.

FIG. 1 shows how the suction-discharge impeller T is housed in the pumping chamber 5. It has the equidistantly situated blades 14 which discharge the cleaning liquid L through the discharge nozzle 6, and the axial suction extension 15 which is housed in the tubular extension 1 of the pump body member CB.

The free end of the shaft 16 of the electric motor M is fixedly attached to the suction-discharge impeller T through the sealing bushing C, as shown in FIG. 1.

In this way, the electric motor M is housed in the casing E in the receptacle formed by the rear cover TC, by way of the tubular extension 9 and orifice 10 formed therein, and the sealing bushing C.

The sealing bushing C simultaneously carries out two well differentiated functions: it prevents the passage of cleaning liquid L into the motor M receptacle, which would cause faults and/or malfunctioning of the motor M and it acts as a damper for the vibration caused when the motor M is running.

The level sensing device D has the bent tubular extension ET; the passage body member CP; the free ends c1, c2 of the conductors CO respectively connected to the connection terminals 12, 13 disposed in the rear cover TC; the float F and the stop valve VC, both housed in the bent tubular extension ET.

FIGS. 1, 4, 5 and 6 show how the end A of the pump body member CB is formed with the bent tubular extension ET constituted by two portions 17, 18 of different length. Said portions 17, 18 are formed internally, respectively, with passages 17a, 18a of different diameters which are connected together in the bend of the extension ET. The horizontal portion 17 is tangentially in communication with the pumping chamber 5 of the pump body member CB as shown in FIG. 3. The vertical portion 18 is arranged parallel to the centre axis of the pump CB and the upper end thereof is fixedly connected to the passage body member CP which, in turn, as shown in FIG. 1, is attached to the rear cover TC.

FIGS. 1, 4, 5 and 6 show how the bend of the tubular extension ET comprises the seal 19 which presents the outflow of cleaning liquid L to the outside. The seal 19 is provided by the manufacturing conditions of the pump body member CB described in this embodiment.

The passage body member CP has the tubular intake 20 which is perpendicular to the casing E as shown in FIG. 1, it is inserted partly in the reservoir DP by way of the through hole 21 provided with the seal 22.

FIG. 1 shows how the passage body member CP is formed internally with the bent passage 23 constituted by the two portions 23a and 23b of different internal configuration. In this way, a fluid communication is established between the reservoir DP and the pumping chamber 5 through the passages 17a and 18a of the tubular extension ET and the bent passage 23 of the passage body member CP.

The portion 23a is constituted by two cylindrical portions 24 and 25 of different diameter connected together by a frustoconical portion 26. The larger diameter cylindrical portion 24 is formed internally with the tubular intake 20.

The portion 23b is constituted by the two cylindrical portions 27 and 28 of different diameter. The smaller diameter cylindrical portion 27 is connected to the portion 25 of the portion 23b. The larger diameter cylindrical portion 28 contains the free ends c1 and c2 of the conductors CO which, as said above, are respectively connected with the connection terminals 12, 13 arranged on the outer surface of the rear cover TC as shown in FIGS. 1 and 2.

The free ends c1 and c2 are housed in the passage body member CP. They no insulation and are spaced apart opposite each other at a relatively short distance, as shown in FIGS. 1, 4, 5 and 6.

FIGS. 1, 4, 5 and 6 show how the float F is housed in the chamber defined by the passage body member CP and the stop valve VC in the passage 18a of the vertical portion 18 of the extension ET.

The float F is essentially cylindrical and is of a smaller diameter than the diameter of the passage 18a in which it is housed. In this way the float F may slide longitudinally with sufficient clearance to allow the cleaning liquid L to flow through the passage 29 in view of the diameter difference between the passage 18a and the float F.

The float F is formed at the end opposite the passage body member CP with the essentially cylindrical centered extension 30 which is practically entirely ensheathed by the metal contact 31, as shown on a larger scale in FIGS. 4, 5 and 6.

The said centered extension 30 and metal contact 31 may be housed in the passage body member CP as shown in FIG. 4. In this case. The metal contact 31 makes an electrical circuit across the free ends c1 and c2 of the conductors CO connecting the terminals 12 and 13, respectively, arranged in the rear cover TC.

The stop valve VC is composed, as shown on a larger scale in FIGS. 4, 5 and 6, by the main body member 32, the closing chamber 33; and the valve body member 34.

The main body member 32 is essentially cylindrical and is fixedly attached to the portion 35 of the vertical portion 18 of the bent tubular extension ET. Said main body member 32 is located at a short distance from the bend of the said extension ET. The main body member 32 is provided with the centered through hole 36. The end of the hole opposite the closing chamber 33 is formed with the frustoconical valve seat 37, such that the closing chamber 33 of the valve VC and the chamber occupied by the float F are in communication with one another only across the centered hole 36.

The closing chamber 33 is formed between the main body member 32 and the perimetral shoulder 38 formed on the vertical portion 18. Said perimetral shoulder 38 defines the centered through hole 39 establishing communication with the passage 17a of the horizontal portion 17 of the tubular extension ET. The closing chamber 33 is provided with longitudinal partitions 40 for positioning the valve body member 34 relative to the through hole 39 in such a way that the valve body member 34 may not block the through hole 39 in any way whatsoever.

The valve body member 34 is essentially spherical and is dimensioned in functional correspondence with the valve seat 37 of the main body member 32. The valve body member 34 is permanently housed in the closing chamber 33 and blocks the passage of the cleaning liquid L to the chamber occupied by the float F when the suction-discharge impeller T is in operation under the pressure of the cleaning liquid L itself.

When the windscreen washer pump with level sensing device according to the invention is suitably coupled to the cleaning liquid L reservoir DP, as shown in FIG. 1 of the drawing sheet, the level sensing device D works as follows.

In FIG. 4, the level of cleaning liquid L contained in the reservoir DP is shown as N and is higher than the present minimum level. Under these conditions, the centered extension 30 of the float F occupies the position shown in the said Figure in the interior of the passage body member CP, in which the metal contact 31, covering the extension 30, makes an electrical circuit across the ends c1 and c2 of the conductors CO connecting the terminals 12 and 13, respectively, on the rear cover TC of the casing E, Thereby the corresponding circuit prevents the acoustical and/or light alarm signal arranged on the vehicle dashboard from being activated.

In FIG. 5 the level N of the cleaning liquid L is below the preset minimum level. Under these conditions, the float F occupies a position in the chamber defined by the passage body member CP and by the stop valve VC in which the metal contact 31 covering the extension 30 of the float F, does not make a circuit across the ends c1 and c2 of the conductors CO and, consequently, across the terminals 12 and 13. Therefore the said alarm signal showing that the cleaning liquid L contained in the reservoir DP has reached a level below the present minimum level is activated through the corresponding circuit.

FIG. 6 shows the action of the stop valve VC. In fact, once the level of the liquid L is below the preset minimum level, the valve body 34, on blocking the through hole 36 of the main body member 32, prevents the passage of liquid L to the chamber occupied by the float F when the liquid L, pumped by the suction-discharge impeller T tends to flow from the pumping chamber 5 to the said float F chamber. This prevents the float F from rising in the passage 18a of the vertical portion 18 and the metal contact 31 from making an electrical circuit across the free ends c1 and c2 of the conductors CO, which would cause deactivation of the alarm signal, consequently providing false information on the amount of liquid L available in the reservoir DP.

Once the reservoir DP has been filled with cleaning liquid L to above the preset minimum level, the float F recovers the position shown in FIG. 4, deactivating the alarm signal in consequence, and the level sensing device D is returned to the previously described operative conditions.

It will be understood that each of the elements described above, or two or more together, may also find a useful application in other types of constructions differing from the types described above.

While the invention has been illustrated and described as embodied in a windscreen washer pump provided with level sensing device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A windscreen washer pump, comprising a casing which is formed by a pump body member provided at one end with an axial tubular cleaning liquid suction extension, and a rear cover connected with said pump body member and supporting connection terminals, said casing forming a pumping chamber with a tangentially disposed nozzle and a sealed container; a suction discharge impeller accommodated in said pumping chamber and sucking a cleaning liquid and discharging the cleaning liquid through said discharge nozzle; an electric drive motor accommodated in said sealed container and driving said impeller, said motor being arranged on said rear cover and connected to supply lines; a cleaning liquid reservoir; and a level sensing device including a bent tubular extension located besides said pump body member and extending to an end provided with said pumping chamber, said tubular extension having one component portion which is a horizontal portion and communicates with said pumping chamber, and another component portion which is a vertical portion and extends parallel to a central axis of said casing up to relatively short distance from said rear cover, said level sensing device further having a passage member which connects said rear cover and an upper end of said bent tubular extension and is provided with a free tubular intake projecting normal to a longitudinal axis of said casing for establishing a permanent free communication with an inside of said cleaning liquid reservoir, so that when there is a sufficient amount of cleaning liquid it may flow between said tubular intake and said pumping chamber of said body member of said casing, said sensing device further having conductors which have free uninsulated ends located in an interior of said passage member and spaced apart at a relatively short distance and also connected at opposite ends to said connection terminal supported in said rear cover, said level sensing device finally having a float and a stop valve provided in an interior of said vertical portion of said bent tubular extension and located close to a bend of said extension, said float being freely slidable along a chamber situated in said vertical portion of said extension between said stop valve and said passage member.

2. A windscreen washer pump as defined in claim 1, wherein said stop valve has an essentially cylindrical main body member which is fixedly attached to said vertical portion of said bent extension and provided with a central axial through hole which, on a side facing the bend of said tubular extension is formed with a closing seat, said stop valve also having a closing chamber located adjacent said main body member on a side provided with said closing seat, said closing chamber being formed longitudinally by said main body member and by a perimetral shoulder formed in said vertical portion and defining a through hole.

3. A windscreen washer pump as defined in claim 2, wherein said stop valve includes an essentially spherical closing body member which is dimensioned in correspondence with said closing seat of said main body member and permanently housed in said closing chamber, said closing body member stopping said central axial through hole of said main body member and therefore preventing the cleaning liquid upwardly through said stop valve when the liquid is urged by a pumping effect of said impeller in operation from said pumping chamber into said bent tubular extension, said stop valve allowing, nevertheless, when there is no mechanical pumping effect, the cleaning liquid to flow freely in both directions so as to maintain constant fluid communication with said reservoir.

4. A windscreen washer pump as defined in claim 1, wherein said float which is arranged in said vertical portion of said bent extension and in said chamber defined between said stop valve and said passage body member, is essentially cylindrical with a smaller diameter than a diameter of said vertical portion of said bent extension, so that it can freely slide longitudinally, said float having a free end located adjacent to said passage body member and provided with a smaller diameter extension which may enter in said passage body member, said extension of said float being provided in its interior with a metal contact which can make an electrical circuit across free ends of said conductors arranged in said passage body member.

* * * * *